(12) United States Patent
Li (10) Patent No.: US 11,234,338 B2
(45) Date of Patent: Jan. 25, 2022

(54) BEZEL AND DISPLAY DEVICE

(71) Applicants: BOE TECHNOLOGY GROUP CO., LTD., Beijing (CN); HEFEI BOE DISPLAY LIGHTING CO., LTD., Anhui (CN)

(72) Inventor: Yeyong Li, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 24 days.

(21) Appl. No.: 16/081,859

(22) PCT Filed: Jan. 29, 2018

(86) PCT No.: PCT/CN2018/074428
§ 371 (c)(1),
(2) Date: Aug. 31, 2018

(87) PCT Pub. No.: WO2019/015293
PCT Pub. Date: Jan. 24, 2019

(65) Prior Publication Data
US 2021/0185836 A1 Jun. 17, 2021

(30) Foreign Application Priority Data
Jul. 20, 2017 (CN) .......................... 201720887852.6

(51) Int. Cl.
*H05K 5/02* (2006.01)
*H05K 5/00* (2006.01)

(52) U.S. Cl.
CPC ............. *H05K 5/02* (2013.01); *H05K 5/0017* (2013.01)

(58) Field of Classification Search
CPC .. H05K 5/02; H05K 5/0004; G02F 1/133308; G02F 1/133328
See application file for complete search history.

(56) References Cited

U.S. PATENT DOCUMENTS 7,697,086 B2 * 4/2010 Yang .................. G02F 1/133308
349/58
2012/0268666 A1 * 10/2012 Nakamichi .......... H05K 5/0213
348/843

(Continued)

FOREIGN PATENT DOCUMENTS

CN 201237682 Y 5/2009
CN 201274618 Y 7/2009

(Continued)

OTHER PUBLICATIONS

International Search Report and Written Opinion for Application No. PCT/CN2018/074428, dated May 7, 2018, 12 Pages.

*Primary Examiner* — Mukundbhai G Patel
(74) *Attorney, Agent, or Firm* — Brooks Kushman P.C.

(57) ABSTRACT

The present disclosure provides a bezel and a display device. The bezel includes: a first sub-bezel including a first connection sheet and a third connection sheet connected to each other to define a first angle, the first connection sheet and the third connection sheet including a first engaging region and a third engaging region respectively; and a second sub-bezel including a second connection sheet and a fourth connection sheet connected to each other to define a second angle, the second connection sheet and the fourth connection sheet including a second engaging region and a fourth engaging region respectively. The first engaging region is in engagement with the second engaging region, and the third engaging region is in engagement with the fourth engaging region, to enable the first sub-bezel to be connected to the second sub-bezel.

20 Claims, 4 Drawing Sheets

(56) References Cited

U.S. PATENT DOCUMENTS

| | | | | |
|---|---|---|---|---|
| 2012/0320443 | A1* | 12/2012 | Fujiwara | G06F 1/1601 |
| | | | | 359/238 |
| 2014/0326420 | A1* | 11/2014 | Kaishian | B44D 3/185 |
| | | | | 160/381 |
| 2015/0015793 | A1* | 1/2015 | Noguchi | H05K 5/0017 |
| | | | | 348/725 |

FOREIGN PATENT DOCUMENTS

| | | |
|---|---|---|
| CN | 204719369 U | 10/2015 |
| CN | 205750196 U | 11/2016 |
| CN | 106211666 A | 12/2016 |
| CN | 206020861 U | 3/2017 |
| CN | 206893214 U | 1/2018 |
| CN | 207123676 U | 3/2018 |

* cited by examiner

BEZEL AND DISPLAY DEVICE

CROSS-REFERENCE TO RELATED APPLICATIONS

This application is the U.S. national phase of PCT Application No. PCT/CN2018/074428 filed on Jan. 29, 2018, which claims priority to Chinese Patent Application No. 201720887852.6 filed on Jul. 20, 2017, which are incorporated herein by reference in their entireties.

TECHNICAL FIELD

The present disclosure relates to the field of display product manufacturing technology, in particular to a bezel and a display device.

BACKGROUND

Aluminium alloy is capable of being manufactured simply and treated easily, and it has become more and more popular among consumers. When an overall machine is provided with a bezel made of the aluminium alloy, it is able to provide a more beautiful and fashionable appearance as compared with the bezel made of plastics. Currently, a large-size display panel is mainly provided with the bezel made of the aluminium alloy. However, light leakage may occur to the bezel made of aluminium alloy.

SUMMARY

An object of the present disclosure is to provide a bezel and a display device, so as to prevent the occurrence of light leakage for the bezel of a display panel.

In one aspect, the present disclosure provides a bezel, applied in a display panel, including:

a first sub-bezel including a first connection sheet and a third connection sheet connected to each other to define a first angle, the first connection sheet and the third connection sheet including a first engaging region and a third engaging region respectively; and a second sub-bezel including a second connection sheet and a fourth connection sheet connected to each other to define a second angle, the second connection sheet and the fourth connection sheet including a second engaging region and a fourth engaging region respectively, where the first engaging region is in engagement with the second engaging region, and the third engaging region is in engagement with the fourth engaging region, to enable the first sub-bezel to be connected to the second sub-bezel.

In a possible embodiment of the present disclosure, the first angle between the first connection sheet and the third connection sheet is equal to the second angle between the second connection sheet and the fourth connection sheet.

In a possible embodiment of the present disclosure, the first sub-bezel further includes a fifth connection sheet and the second sub-bezel further includes a sixth connection sheet in engagement with the fifth connection sheet. The first connection sheet, the third connection sheet and the fifth connection sheet of the first sub-bezel are connected to define a ∏-shaped structure, and the second connection sheet, the fourth connection sheet and the sixth connection sheet of the second sub-bezel are connected to define another ∏-shaped structure.

In a possible embodiment of the present disclosure, the first engaging region is provided with a first slot, and the second engaging region is provided with a first engaging member clamped into the first slot.

In a possible embodiment of the present disclosure, the first engaging region is located at a first side of the first connection sheet connected to the second connection sheet, and the first slot is formed when the first side is depressed inwardly in a direction perpendicular to the first connection sheet. The second engaging region is located at a second side of the second connection sheet connected to the first connection sheet, and the first engaging member is formed when the second side is curved outwardly in a direction perpendicular to the second connection sheet.

In a possible embodiment of the present disclosure, the third connection sheet is formed when the first connection sheet extends in a direction along a third side adjacent to the first side of the first connection sheet and is curved in a direction perpendicular to the first connection sheet. The fourth connection sheet is formed when the second connection sheet extends along a fourth side adjacent to the second side of the second connection sheet and is curved in a direction perpendicular to the second connection sheet. The third engaging region is in engagement with the fourth engaging region, so as to enable the third connection sheet to be connected to the fourth connection sheet.

In a possible embodiment of the present disclosure, the third engaging region is provided with a second slot, and the fourth engaging region is provided with a second engaging member clamped into the second slot.

In a possible embodiment of the present disclosure, the second slot is of a same structure as the first slot, and the second engaging member is of a same structure as the first engaging member.

In a possible embodiment of the present disclosure, the third connection sheet includes a fifth side where the third connection sheet is connected to the first connection sheet, and a seventh side opposite to the fifth side. The fifth connection sheet is formed when the third connection sheet extends along the seventh side and is curved in a direction perpendicular to the third connection sheet, and the fifth connection sheet includes a fifth engaging region. The fourth connection sheet includes a sixth side where the fourth connection sheet is connected to the second connection sheet and an eighth side opposite to the sixth side. The sixth connection sheet is formed when the fourth connection sheet extends along the eighth side and is curved in a direction perpendicular to the fourth connection sheet, and the sixth connection sheet includes a sixth engaging region. The fifth engaging region is in engagement with the sixth engaging region, so as to enable the fifth connection sheet to be in engagement with the sixth connection sheet.

In a possible embodiment of the present disclosure, the fifth engaging region includes a third slot, and the sixth engaging region includes a third engaging member clamped into the third slot.

In a possible embodiment of the present disclosure, the fifth engaging region is located at a ninth side of the fifth connection sheet connected to the sixth connection sheet, the ninth side of the fifth connection sheet is arranged adjacent to the fifth side and the seventh side, and the third slot includes serrated grooves depressed inwardly and arranged at intervals on the ninth side. The sixth engaging region is located at a tenth side of the sixth connection sheet connected to the fifth connection sheet, the tenth side of the sixth connection sheet is arranged adjacent to the sixth side and the eighth side, and the third engaging member includes serrated protrusions projected outwardly on the tenth side at a position corresponding to the third slot. A shape of each of the serrated grooves of the fifth connection sheet complementarily matches a shape of each of the serrated protrusions of the sixth connection sheet.

In a possible embodiment of the present disclosure, each of the serrated grooves includes a first side wall and a second side wall, and a first sub-slot is arranged in one of the first side wall and the second side wall. Each of the serrated protrusions includes a first side surface and a second side surface, and a first engaging sub-member is arranged on one of the first side surface and the second side surface and is clamped into the first sub-slot.

In a possible embodiment of the present disclosure, each of the serrated grooves includes a first side wall and a second side wall, and a first sub-slot and a second sub-slot are arranged in the first side wall and the second side wall respectively. Each of the serrated protrusions includes a first side surface and a second side surface, and a first engaging sub-member clamped into the first sub-slot and a second engaging sub-member clamped into the second sub-slot are arranged on the first side surface and the second side surface respectively.

In a possible embodiment of the present disclosure, the first sub-slot is of a trapezoidal cross section, and the first engaging sub-member is a trapezoidal protrusion clamped into the first sub-slot.

In a possible embodiment of the present disclosure, the second sub-slot is of an elliptical cross section, and the second engaging sub-member is an elliptical protrusion clamped into the second sub-slot.

In a possible embodiment of the present disclosure, the first connection sheet and the second connection sheet are arranged at a same plane.

In a possible embodiment of the present disclosure, an angle between the first connection sheet and the third connection sheet, and an angle between the third connection sheet and the fifth connection sheet are 90°, and an angle between the second connection sheet and the fourth connection sheet, and an angle between the fourth connection sheet and the sixth connection sheet are 90°.

In a possible embodiment of the present disclosure, an angle between the third connection sheet and the fourth connection sheet is 90°, and the fifth connection sheet and the sixth connection sheet are located at a same plane.

In another aspect, the present disclosure further provides a display device including the above-mentioned bezel and a display panel surrounded by the bezel.

According to technical solutions of the present disclosure, the first sub-bezel and the second sub-bezel are provided separately and connected to each other, so as to reduce the manufacture cost of a large-size bezel and improve the stability thereof. In addition, the first engaging region is in engagement with the second engaging region, and thus there is no gap between the first sub-bezel and the second sub-bezel.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The features and principles of the present disclosure will be described hereinafter in conjunction with the drawings and embodiments. The following embodiments are for illustrative purposes only, but shall not be construed as limiting the scope of the present disclosure.

Usually, a bezel of a large-size display panel consists of three segments, and there is a gap between each corner where two segments are connected to each other. Therefore, there is a risk of light leakage.

An object of the present disclosure is to provide a bezel and a display device, so as to prevent the occurrence of light leakage for the bezel of a display panel.

Figure 1:
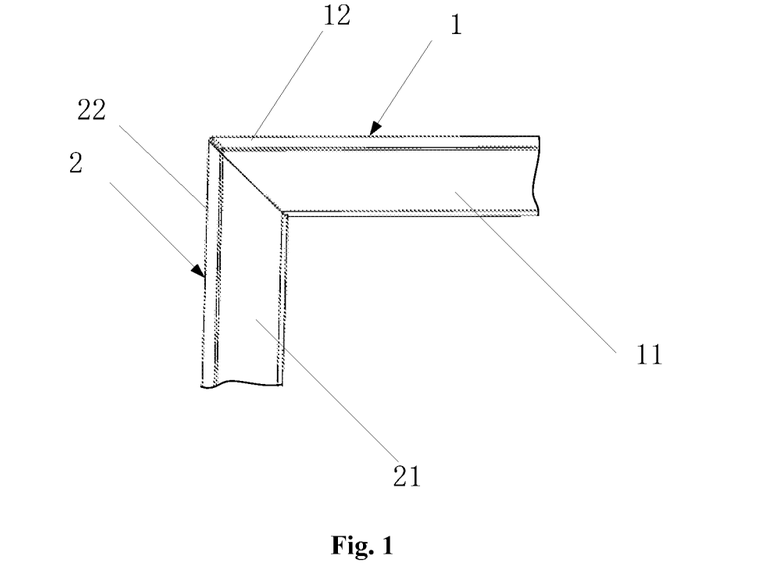
FIG. 1 is a schematic structural diagram showing a first side of a bezel according to embodiments of the present disclosure.

Reference is made to FIG. 1, which shows a first side of a bezel according to embodiments of the present disclosure. The bezel includes:

a first sub-bezel 1 including a first connection sheet 11 corresponding to a front surface of a display panel and a third connection sheet 12 corresponding to a side surface of the display panel when the bezel is connected to the display panel, the first connection sheet 11 and the third connection sheet 12 being connected to each other to define a first angle, the first connection sheet 11 and the third connection sheet 12 including a first engaging region and a third engaging region respectively; and a second sub-bezel 2 including a second connection sheet 21 corresponding to the front surface of the display panel and a fourth connection sheet 22 corresponding to another side surface of the display panel when the bezel is connected to the display panel, the second connection sheet 21 and the fourth connection sheet 22 being connected to each other to define a second angle, the second connection sheet 21 corresponding to the first connection sheet 11, the second connection sheet 21 and the fourth connection sheet 22 including a second engaging region and a fourth engaging region respectively, where the first engaging region is in engagement with the second engaging region, and the third engaging region is in engagement with the fourth engaging region, so as to connect the first sub-bezel 1 to the second sub-bezel 2.

In a possible embodiment of the present disclosure, the first angle between the first connection sheet 11 and the third connection sheet 12 is equal to the second angle between the second connection sheet 21 and the fourth connection sheet 22.

In a possible embodiment of the present disclosure, the first connection sheet 11 and the second connection sheet 21 are located at a same plane, i.e., a plane arranged parallel to the front surface of the display panel when the bezel is connected to the display panel.

The first connection sheet 11 and the second connection sheet 21 may not be arranged at the same plane too, and at this time there may be a small angle therebetween. In a possible embodiment of the present disclosure, this angle is smaller than 30°, and it may be set in accordance with the actual design. The first sub-bezel 1 is connected to the second sub-bezel 2 in a spliced manner through the engagement of the first engaging region with the second engaging region. When the bezel is applied to a large-size display product, it is able to reduce the manufacture cost and improve the stability of the product. In addition, when the first engaging region is in engagement with the second engaging region, there is no gap between the first engaging region and the second engaging region, so it is able to prevent the occurrence of light leakage between the first sub-bezel 1 and the second sub-bezel 2.

The first engaging region and the second engaging region may be of various structures and connected to each other in various ways, as long as no gap is provided between the first sub-bezel 1 and the second sub-bezel 2. In a possible embodiment of the present disclosure, the first engaging region is provided with a first slot 111, and the second engaging region is provided with a first engaging member 211 corresponding to the first slot 111. Through the cooperation of the first engaging member 211 and the first slot 11, it is able for the first engaging region to be connected to the second engaging region closely.

The first slot 111 and the first engaging member 211 may each be of various structures. In a possible embodiment of the present disclosure, the first engaging region is located at a first side of the first connection sheet 11 connected to the second connection sheet 21, and the first slot 111 is formed when the first side is depressed inwardly in a direction perpendicular to the first connection sheet 11.

The second engaging region is located at a second side of the second connection sheet 21 connected to the first connection sheet 11, and the first engaging member 211 is formed when the second side is curved outwardly in a direction perpendicular to the second connection sheet 21. The first engaging member 211 may be clamped into the first slot 111.

The first engaging member 211 is inserted into the first slot 111, and the first engaging member 211 and the first slot 111 overlap each other in a direction perpendicular to the first connection sheet 11. In other words, after the bezel has been assembled with the display panel, the first engaging member 211 and the first slot 111 at least partially overlap each other in a direction perpendicular to the display panel. At this time, there is no gap between the first connection sheet 11 and the second connection sheet 21, so as to prevent the occurrence of light leakage.

The first connection sheet includes the first side and a third side adjacent to the first side. In a possible embodiment of the present disclosure, the third connection sheet 12 is formed when the first connection sheet 11 extends along the third side and is curved in a direction perpendicular to the first connection sheet 11.

The second connection sheet includes the second side and a fourth side adjacent to the second side. The fourth connection sheet 22 is formed when the second connection sheet 21 extends along the fourth side and is curved in a direction perpendicular to the second connection sheet 21.

The third engaging region is in engagement with the fourth engaging region, so as to enable the third connection sheet 12 to be connected to the fourth connection sheet 22 closely.

In a possible embodiment of the present disclosure, a plane where the third connection sheet 12 is located is perpendicular to a plane where the fourth connection sheet 22 is located.

The third engaging region and the fourth engaging region may each be of various structures, as long as there is no gap when the third engaging region is in engagement with the fourth engaging region. In a possible embodiment of the present disclosure, the third engaging region is provided with a second slot 221, and the fourth engaging region is provided with a second engaging member 121 corresponding to the second slot 221.

The second slot 221 and the second engaging member 121 may each be of various structures. In a possible embodiment of the present disclosure, the second slot 221 is of a same structure as the first slot 111, and the second engaging member 121 is of a same structure as the first engaging member 211. Of course, the second slot 221 may also be of a structure different from the first slot 111, and the second engaging member 121 may also be of a structure different from the second slot 211, as long as the second slot 221 is capable of being in engagement with the second engaging member 121 so as not to provide any gap.

Figure 3:
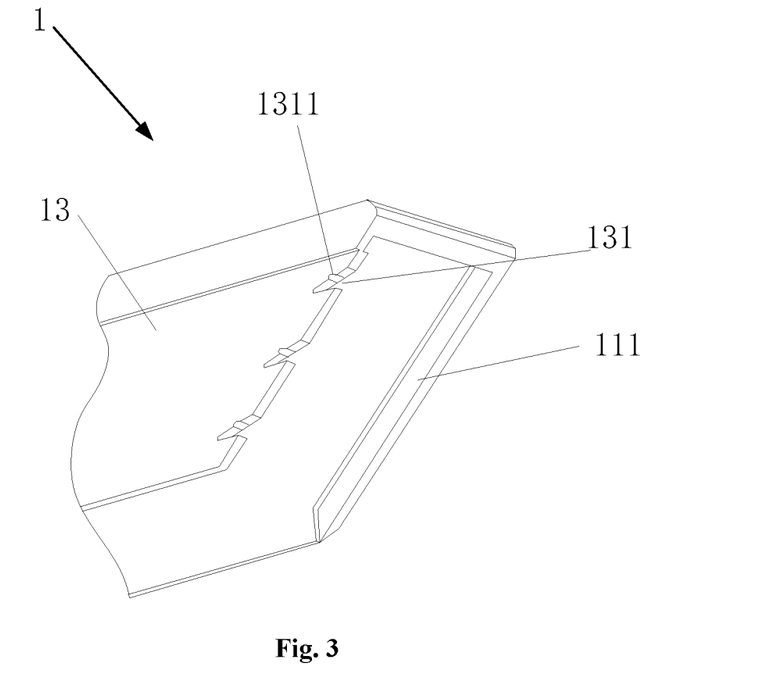
FIG. 3 is a schematic structural diagram showing a first sub-bezel according to embodiments of the present disclosure.

Reference is made to FIG. 3, which shows the first sub-bezel. The first sub-bezel 1 further includes a fifth connection sheet 13. The third connection sheet 12 includes a fifth side where the third connection sheet 12 is connected to the first connection sheet 11, and a seventh side opposite to the fifth side. The fifth connection sheet 13 is formed when the third connection sheet 12 extends along the seventh side and is curved in a direction perpendicular to the third connection sheet 12. Correspondingly, as shown in FIG. 3, the first connection sheet 11, the third connection sheet 12 and the fifth connection sheet 13 are connected to define a ⊓-shaped structure. The fifth connection sheet 13 includes a fifth engaging region.

In a possible embodiment of the present disclosure, an angle between any two adjacent sheets of the first connection sheet 11, the third connection sheet 12 and the fifth connection sheet 13 is 90°, or of any other value. This angle may be set in accordance with a specific shape of an edge of the display panel, so as to enable the bezel to be assembled with the display panel in a better manner.

Figure 5:
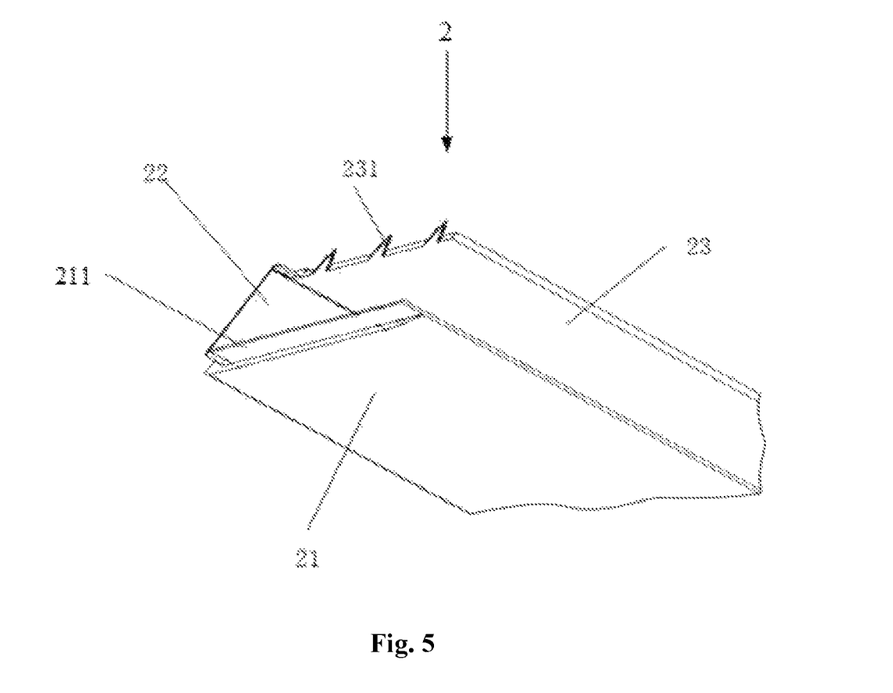
FIG. 5 is a schematic structural diagram showing a second sub-bezel according to embodiments of the present disclosure.

Reference is made to FIG. 5, which shows the second sub-bezel. The second sub-bezel 2 further includes a sixth connection sheet 23. The fourth connection sheet 22 includes a sixth side where the fourth connection sheet 22 is connected to the second connection sheet 21 and an eighth side opposite to the sixth side. The sixth connection sheet 23 is formed when the fourth connection sheet 22 extends along the eighth side and is curved in a direction perpendicular to the fourth connection sheet 22. Correspondingly, as shown in FIG. 5, the second connection sheet 21, the fourth connection sheet 22 and the sixth connection sheet 23 are connected to define ⊓-shaped structure. The sixth connection sheet 23 includes a sixth engaging region.

Figure 2:
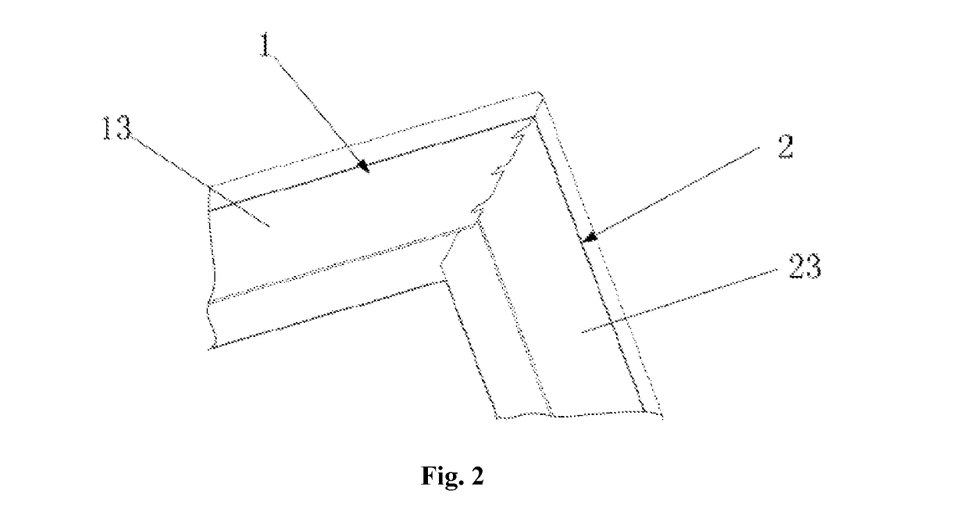
FIG. 2 is a schematic structural diagram showing a second side of the bezel according to embodiments of the present disclosure.

The fifth engaging region is in engagement with the sixth engaging region, so as to enable the fifth connection sheet 13 to be in engagement with the sixth connection sheet closely 23. As shown in FIG. 2 which shows a second side of the bezel, the fifth connection sheet 13 and the sixth connection sheet 23 are closely connected to each other through the engaging regions.

In a possible embodiment of the present disclosure, an angle between any two adjacent sheets of the second connection sheet 21, the fourth connection sheet 22 and the sixth connection sheet 23 is 90°, or of any other value. This angle may be set in accordance with a specific shape of an edge of the display panel, so as to enable the bezel to be assembled with the display panel in a better manner.

In a possible embodiment of the present disclosure, the fifth connection sheet 13 and the sixth connection sheet 23 may be located at a same plane, i.e., a plane arranged parallel to a back surface of the display panel when the bezel is assembled with the display panel.

The fifth connection sheet 13 and the sixth connection sheet 23 may not be arranged at the same plane too, and at this time there may be a small angle therebetween. In a possible embodiment of the present disclosure, this angle is smaller than 30°, and it may be set in accordance with the actual design. The first to sixth connection sheets may each be made of an aluminium alloy material or a plastic steel material.

The first engaging region is in engagement with the second engaging region, the third engaging region is in engagement with the fourth engaging region, and the fifth engaging region is in engagement with the sixth engaging region, so as to enable the first connection sheet 11 to be closely connected to the second connection sheet 21, enable the third connection sheet 12 to be closely connected to the fourth connection sheet 22, and enable the fifth connection sheet 13 to be closely connected to the sixth connection sheet 23. As a result, it is able to ensure the stable connection between the first sub-bezel 1 and the second sub-bezel 2. In addition, no gap is provided between the first sub-bezel 1 and the second sub-bezel 2, so as to prevent the occurrence of light leakage.

The fifth engaging region and the sixth engaging region may each be of various structures. In a possible embodiment of the present disclosure, the fifth engaging region includes a third slot 131, and the sixth engaging region includes a third engaging member 231 corresponding to the third slot 131.

Figure 4:
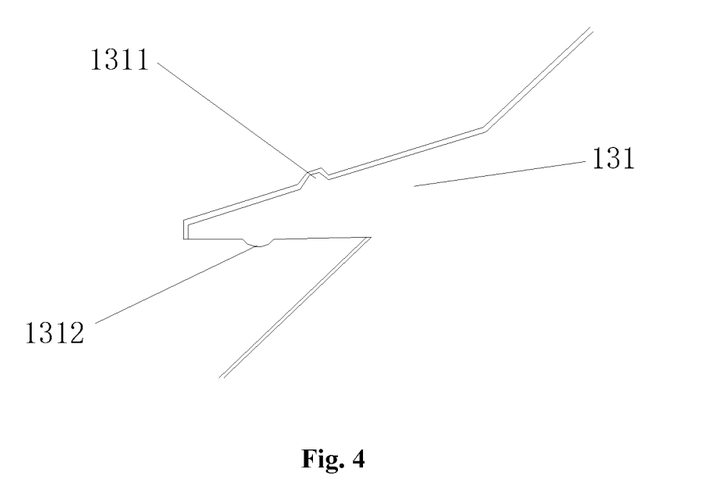
FIG. 4 is a schematic structural diagram showing a third slot of a first sub-bezel according to embodiments of the present disclosure.

To be specific, the fifth engaging region is located at a ninth side of the fifth connection sheet 13 connected to the sixth connection sheet 23, the ninth side of the fifth connection sheet 13 is arranged adjacent to the fifth side and the seventh side, and the third slot 131 includes serrated grooves depressed inwardly and arranged at intervals on the ninth side. The sixth engaging region is located at a tenth side of the sixth connection sheet 23 connected to the fifth connection sheet 13, the tenth side of the sixth connection sheet 23 is arranged adjacent to the sixth side and the eighth side, and the third engaging member 231 includes serrated protrusions projected outwardly on the tenth side at a position corresponding to the third slot 131. As shown in FIG. 4 which shows the third slot 131 of the first sub-bezel and FIG. 6 which shows the third engaging member 231 of the second sub-bezel, a shape of each of the serrated grooves of the fifth connection sheet 13 complementarily matches a shape of each of the serrated protrusions of the sixth connection sheet 23.

Figure 6:
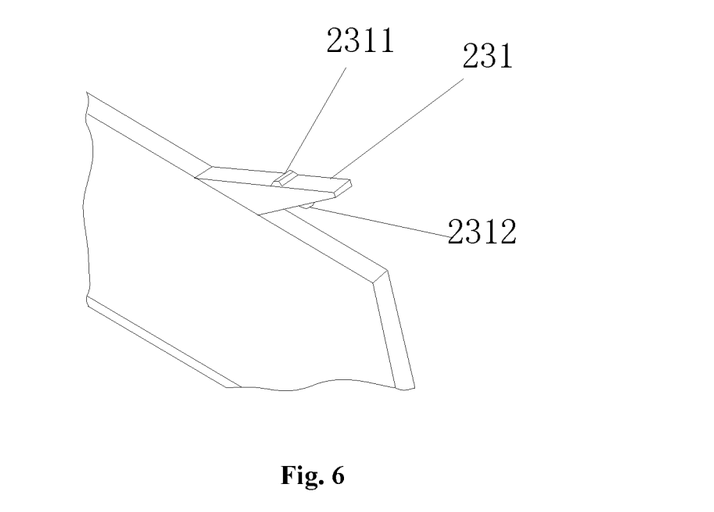
FIG. 6 is a schematic structural diagram showing a third engaging member of a second sub-bezel according to embodiments of the present disclosure.

Through the engagement of the serrated protrusion with the serrated groove, it is able to prevent the movement of the first sub-bezel 1 relative to the second sub-bezel 2.

In order to further prevent the occurrence of light leakage, in a possible embodiment of the present disclosure, as shown in FIG. 4, the serrated groove includes a first side wall and a second side wall, and a first sub-slot 1311 is arranged in one of the first side wall and the second side wall. The serrated protrusion includes a first side surface and a second side surface corresponding to the first side wall and the second side wall respectively, and a first engaging sub-member 2311 is arranged on one of the first side surface and the second side surface and clamped into the first sub-slot 1311.

Through the engagement of the first sub-slot 1311 with the first engaging sub-member 2311, it is able to prevent the movement of the first sub-bezel 1 relative to the second sub-bezel 2 even during a severe impact such as vibration, thereby to effectively prevent the occurrence of light leakage.

In another possible embodiment of the present disclosure, the serrated groove includes a first side wall and a second side wall, and a first sub-slot 1311 and a second sub-slot 1312 are arranged in the first side wall and the second side wall respectively.

As shown in FIG. 6, the serrated protrusion includes a first side surface and a second side surface corresponding to the first side wall and the second side wall respectively, and a first engaging sub-member 2311 clamped into the first sub-slot 1311 and a second engaging sub-member 2312 clamped into the second sub-slot 1312 are arranged on the first side surface and the second side surface respectively.

Through the engagement of the first sub-slot 1311 with the first engaging sub-member 2311 and the engagement of the second sub-slot 1312 with the second engaging sub-member 2312, it is able to further ensure the close connection between the first sub-bezel 1 and the second sub-bezel 2, and prevent the movement of the first sub-bezel 1 relative to the second sub-bezel 2 due to vibration, thereby to prevent the occurrence of light leakage and ensure the firmness of the bezel.

The first sub-slot 1311, the first engaging sub-member 2311, the second sub-slot 1312 and the second engaging sub-member 2312 may each be of various structures. In a possible embodiment of the present disclosure, the first sub-slot 1311 is of a trapezoidal cross section, and the first engaging sub-member 2311 is a trapezoidal protrusion clamped into the first sub-slot 1311. Also, the first sub-slot 1311 and the first engaging sub-member 2311 may each be of a circular, elliptical, or triangular cross section, as long as the first sub-slot 1311 may be in engagement with the first engaging sub-member 2311. The second sub-slot 1312 is of an elliptical cross section, and the second engaging sub-member 2312 is an elliptical protrusion clamped into the second sub-slot 1312. Also, the second sub-slot 1312 and the second engaging sub-member 2312 may each be of a circular, trapezoidal, or triangular cross section, as long as the second sub-slot 1312 may be in engagement with the second engaging sub-member 2312.

Figure 7:
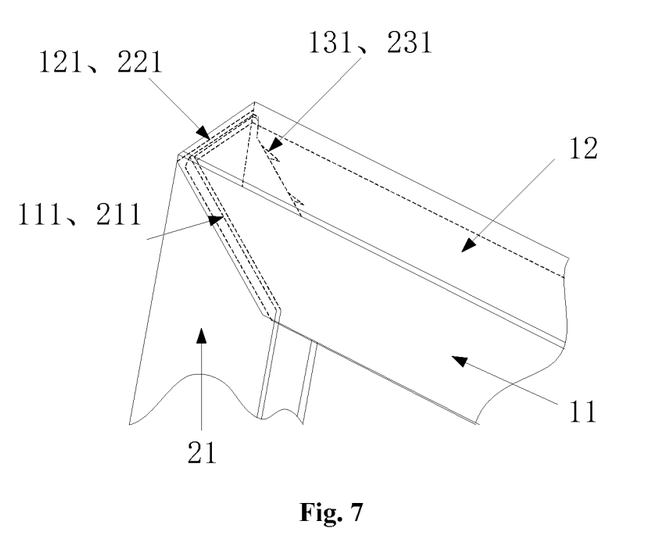
FIG. 7 is a solid view of a connection structure consisting of the first sub-bezel and the second sub-bezel at a first side according to embodiments of the present disclosure.

FIG. 7 is a solid view of a connection structure consisting of the first sub-bezel and the second sub-bezel at a first side. The first sub-bezel 1 is connected to the second sub-bezel 2. The first connection sheet 11 and the second connection sheet 21 are connected to each other through the engagement of the first slot 111 with the first engaging member 211, and the first connection sheet 11 is located at a same plane as the second connection sheet 21. The third connection sheet 12 and the fourth connection sheet 22 (not shown) are connected to each other through the engagement of the second slot 121 with the second engaging member 221, and located at two side surfaces perpendicular to the plane where the first connection sheet 11 is located and the plane where the second connection sheet 21 is located respectively. An angle between the third connection sheet 12 and the fourth connection sheet 22 is 90°. The fifth connection sheet 13 (not shown) and the sixth connection sheet 23 (not shown) are connected to each other through the engagement of the third slot 131 with the third engaging member 231, and located at a same plane perpendicular to the planes where the first connection sheet 11 and the second connection sheet 21 are located respectively. As shown in FIG. 7, no gap is provided between the adjacent connection sheets, and one corner of the display panel is seamlessly surrounded by the six connection sheets, so it is able to effectively prevent the occurrence of light leakage.

Figure 8:
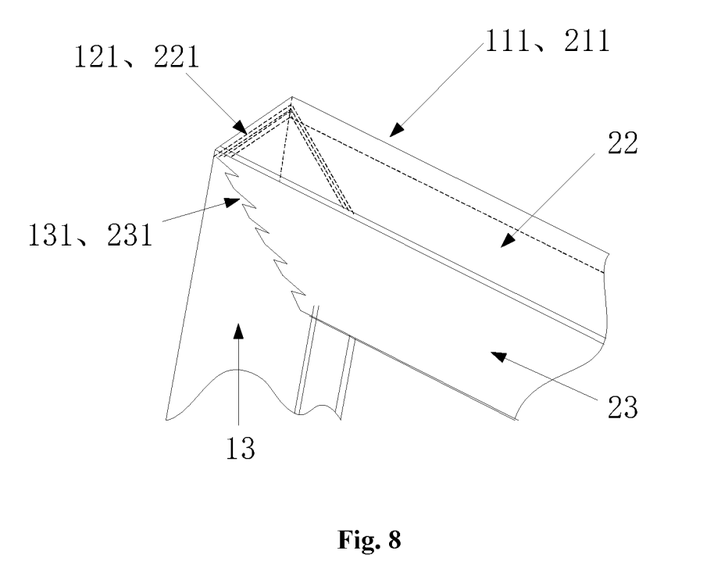
FIG. 8 is a solid view of the connection structure consisting of the first sub-bezel and the second sub-bezel at a second side according to embodiments of the present disclosure.

FIG. 8 is a solid view of the connection structure consisting of the first sub-bezel and the second sub-bezel at a second side opposite to the first side in FIG. 7. Elements in FIG. 8 are the same as those in FIG. 7, and thus will not be particularly defined herein.

The present disclosure further provides in some embodiments a display device including the above-mentioned bezel and a display panel surrounded by the bezel. The features of the bezel have been described hereinabove, and thus will not be particularly defined herein.

The above embodiments are optional embodiments of the present disclosure. It should be noted that, a person skilled in the art may make some modifications and improvements without departing from the principle of the present disclosure, and these modifications and improvements shall also fall within the scope of the present disclosure.

What is claimed is:

1. A bezel, applied in a display panel, comprising:
a first sub-bezel comprising a first connection sheet and a third connection sheet connected to each other to define a first angle, the first connection sheet and the third connection sheet comprising a first engaging region and a third engaging region respectively; and
a second sub-bezel comprising a second connection sheet and a fourth connection sheet connected to each other to define a second angle, the second connection sheet and the fourth connection sheet comprising a second engaging region and a fourth engaging region respectively,
wherein the first engaging region is in engagement with the second engaging region, and the third engaging region is in engagement with the fourth engaging region, to enable the first sub-bezel to be connected to the second sub-bezel,
wherein the first engaging region is provided with a first slot, and the second engaging region is provided with a first engaging member clamped into the first slot,
wherein the first engaging region is located at a first side of the first connection sheet connected to the second connection sheet, and the first slot is formed when the first side is depressed inwardly in a direction perpendicular to the first connection sheet; and
the second engaging region is located at a second side of the second connection sheet connected to the first connection sheet, and the first engaging member is formed when the second side is curved outwardly in a direction perpendicular to the second connection sheet.

2. The bezel according to claim 1, wherein the first angle is equal to the second angle.

3. The bezel according to claim 1, wherein the first sub-bezel further comprises a fifth connection sheet, and the second sub-bezel further comprises a sixth connection sheet in engagement with the fifth connection sheet; and
the first connection sheet, the third connection sheet and the fifth connection sheet of the first sub-bezel are connected to define a ⊓-shaped structure, and the second connection sheet, the fourth connection sheet and the sixth connection sheet of the second sub-bezel are connected to define another ⊓-shaped structure.

4. The bezel according to claim 3, wherein an angle between the first connection sheet and the third connection sheet, and an angle between the third connection sheet and the fifth connection sheet are 90°, and an angle between the second connection sheet and the fourth connection sheet, and an angle between the fourth connection sheet and the sixth connection sheet are 90°.

5. The bezel according to claim 3, wherein an angle between the third connection sheet and the fourth connection sheet is 90°, and the fifth connection sheet and the sixth connection sheet are located at a same plane.

6. The bezel according to claim 1, wherein the first connection sheet comprises the first side and a third side adjacent to the first side, and the third connection sheet is formed when the first connection sheet extends in a direction along the third side and is curved in a direction perpendicular to the first connection sheet; and
the second connection sheet comprises the second side and a fourth side adjacent to the second side, and the fourth connection sheet is formed when the second connection sheet extends along the fourth side and is curved in a direction perpendicular to the second connection sheet.

7. The bezel according to claim 6, wherein the third connection sheet comprises a fifth side where the third connection sheet is connected to the first connection sheet, and a seventh side opposite to the fifth side;
the fifth connection sheet is formed when the third connection sheet extends along the seventh side and is curved in a direction perpendicular to the third connection sheet, and the fifth connection sheet comprises a fifth engaging region;
the fourth connection sheet comprises a sixth side where the fourth connection sheet is connected to the second connection sheet, and an eighth side opposite to the sixth side;
the sixth connection sheet is formed when the fourth connection sheet extends along the eighth side and is curved in a direction perpendicular to the fourth connection sheet, and the sixth connection sheet comprises a sixth engaging region; and
the fifth engaging region is in engagement with the sixth engaging region, to enable the fifth connection sheet to be in engagement with the sixth connection sheet.

8. The bezel according to claim 7, wherein the fifth engaging region comprises a third slot, and the sixth engaging region comprises a third engaging member clamped into the third slot.

9. The bezel according to claim 8, wherein the fifth engaging region is located at a ninth side of the fifth connection sheet connected to the sixth connection sheet, the ninth side of the fifth connection sheet is arranged adjacent to the fifth side and the seventh side, and the third slot comprises serrated grooves depressed inwardly and arranged at intervals on the ninth side;
the sixth engaging region is located at a tenth side of the sixth connection sheet connected to the fifth connection sheet, the tenth side of the sixth connection sheet is arranged adjacent to the sixth side and the eighth side, and the third engaging member comprises serrated protrusions projected outwardly on the tenth side at a position corresponding to the third slot; and a shape of each of the serrated grooves of the fifth connection sheet complementarily matches a shape of each of the serrated protrusions of the sixth connection sheet.

10. The bezel according to claim 9, wherein each of the serrated grooves comprises a first side wall and a second side wall, and a first sub-slot is arranged in one of the first side wall and the second side wall; and each of the serrated protrusions comprises a first side surface and a second side surface, and a first engaging sub-member is arranged on one of the first side surface and the second side surface and is clamped into the first sub-slot.

11. The bezel according to claim 10, wherein the first sub-slot is of a trapezoidal cross section, and the first engaging sub-member is a trapezoidal protrusion clamped into the first sub-slot.

12. The bezel according to claim 9, wherein each of the serrated grooves comprises a first side wall and a second side wall, and a first sub-slot and a second sub-slot are arranged in the first side wall and the second side wall respectively; and each of the serrated protrusions comprises a first side surface and a second side surface, and a first engaging sub-member clamped into the first sub-slot and a second engaging sub-member clamped into the second sub-slot are arranged on the first side surface and the second side surface respectively.

13. The bezel according to claim 12, wherein the second sub-slot is of an elliptical cross section, and the second engaging sub-member is an elliptical protrusion clamped into the second sub-slot.

14. The bezel according to claim 1, wherein the third engaging region is provided with a second slot, and the fourth engaging region is provided with a second engaging member clamped into the second slot.

15. The bezel according to claim 14, wherein the second slot is of a same structure as the first slot, and the second engaging member is of a same structure as the first engaging member.

16. The bezel according to claim 1, wherein the first connection sheet and the second connection sheet are arranged at a same plane.

17. A display device, comprising a display panel and a bezel surrounding the display panel, wherein the bezel comprises:

a first sub-bezel comprising a first connection sheet and a third connection sheet connected to each other to define a first angle, the first connection sheet and the third connection sheet comprising a first engaging region and a third engaging region respectively; and a second sub-bezel comprising a second connection sheet and a fourth connection sheet connected to each other to define a second angle, the second connection sheet and the fourth connection sheet comprising a second engaging region and a fourth engaging region respectively, wherein the first engaging region is in engagement with the second engaging region, and the third engaging region is in engagement with the fourth engaging region, to enable the first sub-bezel to be connected to the second sub-bezel, wherein the first engaging region is provided with a first slot, and the second engaging region is provided with a first engaging member clamped into the first slot, wherein the first engaging region is located at a first side of the first connection sheet connected to the second connection sheet, and the first slot is formed when the first side is depressed inwardly in a direction perpendicular to the first connection sheet; and the second engaging region is located at a second side of the second connection sheet connected to the first connection sheet, and the first engaging member is formed when the second side is curved outwardly in a direction perpendicular to the second connection sheet.

18. The display device according to claim 17, wherein the third connection sheet is formed when the first connection sheet extends and is curved in a direction perpendicular to the first connection sheet, and the third connection sheet comprises the third engaging region; the fourth connection sheet is formed when the second connection sheet extends and is curved in a direction perpendicular to the second connection sheet, and the fourth connection sheet comprises a fourth engaging region; and the third engaging region is in engagement with the fourth engaging region, to enable the third connection sheet to be connected to the fourth connection sheet, wherein the first sub-bezel further comprises a fifth connection sheet, the fifth connection sheet is formed when the third connection sheet extends and is curved in a direction perpendicular to the third connection sheet, the first connection sheet, the third connection sheet and the fifth connection sheet of the first sub-bezel are connected to define a ∏-shaped structure, and the fifth connection sheet comprises a fifth engaging region;

the second sub-bezel further comprises a sixth connection sheet, the sixth connection sheet is formed when the fourth connection sheet extends and is curved in a direction perpendicular to the fourth connection sheet, the second connection sheet, the fourth connection sheet and the sixth connection sheet of the second sub-bezel are connected to define another ∏-shaped structure, and the sixth connection sheet comprises a sixth engaging region; and the fifth engaging region is in engagement with the sixth engaging region, to enable the fifth connection sheet to be connected to the sixth connection sheet.

19. A bezel, applied in a display panel, comprising:

a first sub-bezel comprising a first connection sheet and a third connection sheet connected to each other to define a first angle, the first connection sheet and the third connection sheet comprising a first engaging region and a third engaging region respectively; and a second sub-bezel comprising a second connection sheet and a fourth connection sheet connected to each other to define a second angle, the second connection sheet and the fourth connection sheet comprising a second engaging region and a fourth engaging region respectively, wherein the first engaging region is in engagement with the second engaging region, and the third engaging region is in engagement with the fourth engaging region, to enable the first sub-bezel to be connected to the second sub-bezel, wherein the first engaging region is provided with a first slot, and the second engaging region is provided with a first engaging member clamped into the first slot, wherein the third engaging region is provided with a second slot, and the fourth engaging region is provided with a second engaging member clamped into the second slot.

20. The bezel according to claim 19, wherein the first sub-bezel further comprises a fifth connection sheet, and the second sub-bezel further comprises a sixth connection sheet in engagement with the fifth connection sheet; and the first connection sheet, the third connection sheet and the fifth connection sheet of the first sub-bezel are connected to define a ∏-shaped structure, and the second connection sheet, the fourth connection sheet and the sixth connection sheet of the second sub-bezel are connected to define another ∏-shaped structure.

* * * * *